Dec. 4, 1956   J. E. HERRMANN, JR   2,773,186
SIGNAL-TO-NOISE GENERATORS
Filed Jan. 28, 1955
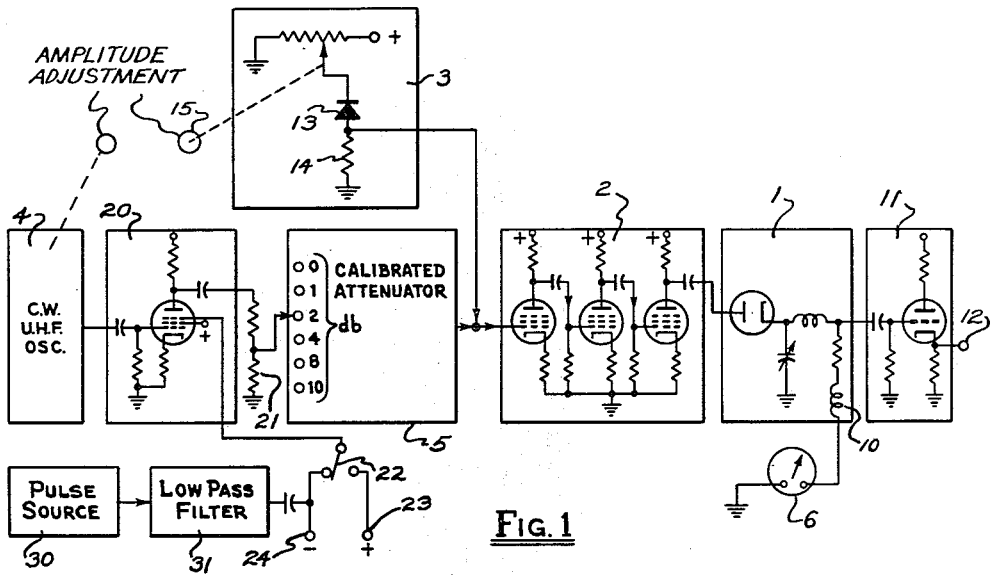
Fig. 1
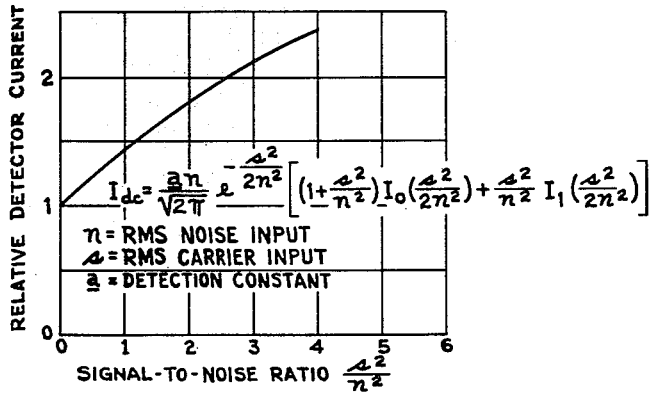
Fig. 2
Fig. 3a. $\Delta/n$ RATIO 3db BELOW 1:1
Fig. 3b. $\Delta/n$ RATIO 1:1
Fig. 3c. $\Delta/n$ RATIO 3db ABOVE 1:1
Fig. 3d. $\Delta/n$ RATIO 6db ABOVE 1:1
INVENTOR.
JOSEPH E. HERRMANN, JR.
BY
ATTYS.

United States Patent Office 2,773,186
Patented Dec. 4, 1956

2,773,186

SIGNAL-TO-NOISE GENERATORS

Joseph E. Herrmann, Jr., Indianapolis, Ind.

Application January 28, 1955, Serial No. 484,858

11 Claims. (Cl. 250—36)

(Granted under Title 35, U. S. Code (1952), sec. 266)

The invention described herein may be manufactured and used by or for the Government of the United States of America for governmental purposes without the payment of any royalties thereon or therefor.

My invention relates to generators of signals and noise, and is particularly directed to a unitary circuit for generating both signal voltages and noise voltages of accurately controllable ratios.

Noise voltage caused by electron movement or the atomic properties of matter is characterized by the complete randomness of frequencies and amplitudes of the smaller components of the voltage. Man-made signal voltages on the other hand are usually controllable as to frequency and amplitude and are non-random or more or less regular in nature. Paradoxically, the energy content of noise is relatively stable and easy to measure by conventional integrating voltmeters or current meters, while the energy content of signal waves is irregular over the time periods familiar to conventional meters and cannot be measured. For example, while the audible range of frequencies of voice voltages is relatively narrow, the amplitudes of the components of the signals vary widely. Pulse signals, on the other hand, may employ single frequency pure sine waves and fixed amplitudes. In no case, however, can the signal voltage be directly evaluated or quantized in terms of the noise voltages through which the signals must travel. Widely spaced pulses of microwave energy, of microseconds durations as used in radar are particularly difficult to indicate on a meter above the noise voltage. That is, heretofore, a generator of both signals and noise with controllable measurable ratios of the two has not been known.

The object of my invention is a signal-noise generator.

A more specific object of my invention is a generator of both signal voltage and noise voltage with means for controlling and indicating the ratio of the two voltages.

Other objects and features of my invention will become apparent from the following description of a preferred embodiment of the invention shown in the accompanying drawing in which:

Fig. 1 is a circuit diagram of my improved signal and noise generator,

Fig. 2 is a graph of the parameters of a linear detector according to my invention, and Figs. 3a, 3b, 3c and 3d are oscillograms of the output of my novel signal and noise generator with various ratios of signal and noise.

According to the mathematical treatment of noise and signal voltages combined in a linear detector by Dr. Stanford Goldman in his volume "Frequency Analysis Modulation and Noise," 1948, pages 339 et seq., it is shown that the direct current output, $I_{dc}$, of a linear detector can be expressed in the terms of the R. M. S. noise input, $n$; the R. M. S. signal input, $s$; the detector constant, $a$; and the base of natural logarithm, $e$ (2.718); thus $$I_{dc} = \frac{an}{\sqrt{2\pi}} e^{-\left(\frac{s^2}{2n^2}\right)} \left[\left(1 + \frac{s^2}{n^2}\right) \cdot I_0 \cdot \left(\frac{s^2}{2n^2}\right) + \frac{s^2}{n^2} \cdot I_1 \cdot \left(\frac{s^2}{2n^2}\right)\right]$$

where $I_0$ and $I_1$ are modified Bessel functions.

Relative detector output may be plotted against signal-to-noise ratio, $s/n$, from the above expression. One such plot is shown in Fig. 2. In this plot the detector constant, $a$, is arbitrarily adjusted so that the detector output current $I_{dc}$ is 1 when the signal is zero. Note that when $s$ is zero the entire expression within the bracket drops to 1, and since $e$ to the zero power becomes 1, $an/\sqrt{2\pi}$ term can be made equal to 1 or equal to a quantity which can be called 1 or unity. Now, add a continuous wave, C. W., signal, $s$, to the detector input. From the graph it can be seen that when the signal-to-noise ratio $s/n$ becomes 1, the relative detector output current $I_{dc}$ rises to 1.45. Hence, in the linear detector we have discovered a fixed relationship between signal and noise. That is, when noise alone is rectified in a linear detector to produce a first output current, and when combined signal current and noise current of equal values are rectified in the same linear detector to produce a second output current, the ratios of the first output current to the second output current becomes 1 to 1.45. Other ratios of signal-to-noise can be read directly from the graph of Fig. 2 or calculated from the above expression for $I_{dc}$ and can be used in calibrating and measuring unknown signal and noise voltages.

According to my invention the detector 1, Fig. 1, may be of any thermionic or cold type which will produce a rectified output linearly proportional to the voltage input. The only requirement of the detector is that the linear portion of its characteristic be linear over the expected operating range of input voltages. Ahead of the detector is the amplifier 2 preferably with manual gain adjustments. To the input of the amplifier is connected the output of the noise generator 3 as well as the output of the continuous wave generator 4. As will more fully hereinafter appear, the output of the continuous wave generator 4 is attenuated by the calibrated attenuator 5. The output, $I_{dc}$, of the linear detector may be measured by an indicating meter 6 of any type which will indicate the amplitude of the detector output current.

In operation, the noise generator only is first turned on and the amplitude of the amplifier noise signal at the output of the amplifier is adjusted to a value above the lower knee of the detector characteristic curve so that all signals of greater amplitude will operate only within the linear portion of the rectifier characteristic. We will call this minimum rectifier output unity or one unit of current and the needle deflection at 6 will be called "one." Then, superimpose the continuous wave signal on the noise signal without changing the applied noise signal and adjust the C. W. signal by appropriate attenuation until the meter needle deflection reads 1.45 times the initial noise reading. We now know that the signal and the noise amplitudes have a ratio of exactly 1 to 1.

Referring more specifically to the circuitry of Fig. 1, the linear detector 1 shown comprises a conventional diode connected directly in the output circuit of the amplifier 2. In series with the diode is preferably connected a choke coil 10 between the cathode of the diode and one terminal of the current meter 6. Where the diode is of the commercial 6AL5 type the current meter may be a commercial 0–1 milliammeter. The output current of the diode is amplified at 11, as by a cathode follower, to produce at the output terminal 12 a direct current voltage free of ripple and proportional to the sum of all signal and noise voltages applied to the input of the diode.

The amplifier 2 may be of any conventional type, the only requirement being that it does not introduce distortion because of non-linear amplification over the entire anticipated range of signal and noise voltages to be relayed to the diode. Manual gain control means not shown is provided for amplifier 2.

The noise generator also may be of any known type. The particular noise generator 3 shown in Fig. 1 comprises simply a rectifier 13 of a semi-conductor type with an adjustable positive voltage applied to the "cathode" terminal of the rectifier to drive a small amount of current through the back resistance of the rectifier. The atomic noise produced by this back current is picked off from across the high value load resistor 14 and applied to the input of amplifier 2. A control knob 15 adjusts the applied positive voltage and, hence, the amplitude of the noise signal.

The continuous wave ultra high frequency oscillator 4 and the noise generator are connected in parallel to the input of amplifier 2. However, according to an important feature of my invention, the oscillator output is passed through the gating tube 20 and hence via coupling resistor 21 through the calibrated attenuator 5. The gating tube 20 is preferably of the multi-grid type such as a pentode, to one of the auxiliary grids of which may be applied a distinct positive or negative D. C. potential to open or close the gate. In the example shown, the suppressor grid is employed to selectively block or pass normal electron flow in gate tube 20. The positive source 23 is adjusted so that when the source is connected to the suppressor grid through switch 22, the gating tube 20 amplifies all signals on the control grid with some optimum gain. The voltage 23 applied is adjusted to a positive value high enough to cause the tube to operate in the region where the suppressor grid transconductance is essentially reduced to zero. When, however, the suppressor grid is connected to the negative source 24, the gate tube is effectively blocked. Where my signal-noise generator is intended to simulate a pulsed radar signal, the pulse source 30 is provided and is coupled through the low pass filter 31 to the negative bias terminal 24 so that positive pulses of the duration and frequency of the desired radar signal may be superimposed upon the negative bias voltage of 24. The amplitude of the superimposed positive pulses is adjusted so that the peak amplitude, as modified by the negative bias, is equal to the positive bias of source 23. Inasmuch as the suppressor grid is operated in zero transconductance region any small variations of the positive pulses are not amplified. Hence, when switch 22 is in the "pulse" position, gate 20 unblocks and amplifies with the same gain as when switch 22 selects the positive bias of source 23. In other words, the amplitude of the ultra high frequency voltage at the output of gate 20 is the same whether the output is continuous or is interrupted by the pulse source.

Low pass filter 31 is employed to attenuate harmonics from the pulse source 30 that may fall into the bandpass of amplifier 2.

The calibrated attenuator 5 is preferably of a commercial type which can be varied in attenuation in steps of one decibel from 1 to 20 decibels. Hence, there may be applied to the input of amplifier 2 a microwave signal of either continuous or pulsed nature in parallel with the noise signal of noise generator 3.

In operation, with the signal source 4 turned off the noise generator 3 and the gain of amplifier 2 are adjusted to produce a needle deflection at meter 6 of unit measured value. Then, with the gate 20 unblocked the output signal from oscillator 4 is added to the noise and the amplitude of the combined output signals is adjusted until the needle deflection moves to 1.45 times the mentioned unit value. If, for example, the noise voltage alone produced a needle deflection of .3 milliampere, the continuous wave signal would be adjusted until the needle deflected to .3×1.45 or .435 milliamperes. It is now known that the continuous wave oscillator output is equal to the noise generator output. Now, by attenuating the continuous wave in the attenuator 5 by known amounts, the output 12 of my system contains known signal-to-noise ratios. If now the switch 22 is thrown to the left hand position to interrupt the continuous wave, the signal to noise ratio remains the same. By no known means, heretofore, have radar pulses of, say, one-half microsecond duration been controllably applied to a noise signal.

The oscillograms of Figs. 3a, 3b, 3c and 3d show pulse signals of microwave energy of .5 microsecond duration applied to continuous noise voltages. In Fig. 3a the signal-to-noise ratio is 3 db below 1:1. In Fig. 3b the signal-to-noise ratio is 1:1, and Figs. 3c and 3d the signal-to-noise ratio has been increased respectively to 3 db and 6 db above 1:1. The difficulties, heretofore, of calibrating test circuits and measuring the ratios of such short pulses in a noise background of unknown character or amplitude, are eliminated.

Many modifications may be made in the components of the specific system above described without departing from the scope of the invention defined in the appended claims.

What I claim is:

1. A signal-to-noise ratio measuring system comprising a noise generator, an amplifier with bandpass characteristic, and a linear detector coupled in cascade, the output of the noise generator being adjustable to produce a current through the detector at a midpoint on the linear portion of the voltage-current characteristic of the detector; a high frequency generator, a gate tube with a control grid and an auxiliary grid, and a calibrated adjustable attenuator coupled in cascade and to the input to said amplifier; and means coupled to the auxiliary grid to selectively open and close the gate tube, with further means to selectively open the gate tube for long periods of time or for repetitive microsecond periods of time.

2. A signal-to-noise generator comprising a noise voltage source, a continuous wave high frequency signal source, a detector and indicator for measuring the noise and signal sources, a gate tube coupled between said signal source and detector, said gate tube comprising an auxiliary grid, a source of positive bias and a source of negative bias, switch means to selectively connect said bias source to said auxiliary grid, and a source of positive pulses coupled to said source of negative bias.

3. In the generator of claim 2, said positive bias being sufficient to cause said gate tube to operate in the region where the auxiliary grid transconductance is substantially reduced to zero.

4. A signal-to-noise generator comprising a source of random noise voltage adjustable in amplitude, a source of continuous wave signal voltage adjustable in amplitude, a linear detector, means coupling the output of the noise source to the detector, an adjustable calibrated attenuator, the attenuator being coupled between the continuous wave source and the detector, and an indicating meter coupled in the output circuit of the detector for comparing the amplitude of the rectified noise voltage with the amplitude of the combined continuous wave and noise voltage.

5. The combination defined in claim 4 further comprising a modulator for said continuous wave coupled between the output of the continuous wave source and said attenuator.

6. In combination in a signal and noise generator, a source of random electrical noise, a source of continuous wave signal, a linear detector, the input of the detector being coupled in parallel to the two sources, an indicating meter connected in the output of the detector means, respectively, to separately adjust the amplitudes of the noise voltage and the signal voltage applied to the detector.

7. The combination defined in claim 6 further comprising a gating means between the continuous wave source and the detector to selectively pass pulses of the continuous wave to the detector.

8. Apparatus for generating combined electrical-noise and continuous-wave currents having known predetermined relative magnitudes comprising in combination: means generating a continuous-wave current; means generating an electrical-noise current; means coupled to the two aforesaid generating means for combining the said electrical-noise and continuous-wave currents to produce a mixed current; means detecting the aforesaid currents coupled to the two aforesaid generating means, said means including a current-magnitude indicator; means for adjusting the magnitude of current from one only of the two said generating means to a desired indicated value; means for rendering the other one of the said generating means inoperative during the said last-mentioned adjustment; and means for adjusting the magnitude of the current generated by the said other one of the generating means until the indicated magnitude of the aforesaid mixed current becomes forty-five percent greater than the said indicated value, such that the magnitudes of the electrical-noise and the continuous-wave currents will be equal.

9. Apparatus as represented in claim 8 including means coupled between the said other one generating means and the said combining means for adjustably attenuating the current generated by the said other one generating means by predetermined known amounts relative to unity.

10. Apparatus as represented in claim 8 including means amplifying the said mixed current coupled between the said combining means and the said detecting means.

11. Apparatus as represented in claim 10 including means modulating at least one of the aforesaid currents coupled between one of the two said generating means and the said combining means.

References Cited in the file of this patent
UNITED STATES PATENTS 2,671,896   De Rosa _____ Mar. 9, 1914